United States Patent [19]

Phelps

[11] Patent Number: 4,661,840

[45] Date of Patent: Apr. 28, 1987

[54] NTSC COLOR TELEVISION TRANSMISSION

[75] Inventor: Arthur C. Phelps, Hollywood, Calif.

[73] Assignee: High Resolution Television, Inc., Los Angeles, Calif.

[21] Appl. No.: 717,862

[22] Filed: Mar. 29, 1985

[51] Int. Cl.⁴ .............................................. H04N 9/45
[52] U.S. Cl. ...................................... 358/16; 358/148; 358/150
[58] Field of Search ...................... 358/16, 17, 12, 148, 358/150, 158

[56] References Cited

U.S. PATENT DOCUMENTS

| | | | |
|---|---|---|---|
| 4,268,852 | 5/1981 | Nakamura | 358/17 |
| 4,278,972 | 7/1981 | Wozniak | 358/17 |
| 4,295,157 | 10/1981 | Machida | 358/16 |
| 4,500,909 | 2/1985 | Machida | 358/17 |
| 4,517,587 | 5/1985 | Aizawa | 358/17 |

*Primary Examiner*—Michael A. Masinick

*Attorney, Agent, or Firm*—Freilich, Hornbaker, Rosen & Fernandez

[57] ABSTRACT

An improved color television transmission compatible with NTSC standards produces a controlled horizontal scan rate at about 15,734 Hz with 227.5 cycles of color subcarrier per line, and a controlled vertical scan rate at about 59.940 Hz to produce frames of two interlaced fields each at a rate of about 29.970 Hz with 59,718.5 cycles of the color subcarrier per field, instead of 59,718.75, thereby eliminating "chroma crawl." The vertical scan rate is controlled by dividing a clock frequency of four times the color subcarrier by four to produce the color subcarrier, and dividing the clock frequency by some set of multiples to produce the horizontal and vertical scan rates with 227.5 cycles of color subcarrier per line and 59,718.75 cycles per field, and once every field, at the end thereof, skipping one cycle of the clock frequency in the generation of the horizontal and field sync pulses for the next field, thereby causing each field to have 59.718.5 cycles of the color subcarrier instead of the 59,718.75 cycles otherwise provided.

4 Claims, 2 Drawing Figures

NTSC COLOR TELEVISION TRANSMISSION

BACKGROUND OF THE INVENTION

This invention relates to color television, and more particularly to a method and apparatus for an improved color television transmission compatible with the standards of the National Television Systems Committee (NTSC).

The NTSC color system is the type of color transmission approved by the Federal Communications Commission in the United States to be compatible with pre-existing monochrome receivers. The approach was to transmit encoded color information on a subcarrier. First I and Q signals are derived from red (R), green (G), and blue (B) camera signals in a color matrix according to the following equations:

$$I = 0.6R - 0.28G - 0.32B$$

$$Q = 0.21R - 0.52G + 0.31B$$

Alternative color matrixing is given by the following equations:

$$I = 0.27(B - Y) + 0.74(R - Y)$$

$$Q = 0.41(B - Y) + 0.48(R - Y)$$

where Y is the luminance signal given by the equation:

$$Y = 0.30R + 0.59G + 0.11B$$

Then the I and Q signals are modulated by the subcarrier in phase for the I signal and in quadrature for the Q signal. At the receiver, the phase encoded I and Q color signals are decoded by synchronously demodulating the inphase and quadrature components to recover the I and Q color signals. A receiver matrix then recovers the R, G and B signals from the recovered I and Q signals, using Y signals, if necessary.

The monochromatic television standard already in place required a frame of 525 lines at a rate of 30 Hz using interlaced fields of 262.5 lines per field at a field rate of 60 Hz. This requires a horizontal scan rate of 15,750 Hz which produces a monochrome signal having components at integral multiples of the horizontal scan rate. In order to transmit the color subcarrier in the 6 MHz band alloted to a television channel by the FCC, it was necessary to select a color subcarrier frequency high in the picture carrier single sideband, but sufficiently below the sound carrier to avoid interfering with the audio signal, which is 4.5 MHz above the picture carrier. That placed the color subcarrier at about 3.7 MHz above the picture carrier. To avoid interference with the monochromatic video signal even that high in the single sideband of the video signal, the color subcarrier frequency was chosen to "interleave" in the gaps of the integral multiples of the line-scanning rate where there is no great amount of video information. These gaps occur at odd multiples of one-half the line-scanning rate.

This need to interleave the color subcarrier sidebands with the picture carrier single sideband thus required the color subcarrier to be at some multiple of one-half the line-scanning rate, which is a multiple of 455 for the color subcarrier to be placed high in the video single sideband, but below the audio carrier. This odd multiple of half the line frequency also results in a minimum beat frequency with the audio carrier.

The precise color subcarrier chosen was 3,579,545 Hz to have 227.5 cycles of the color subcarrier per line scan, thus inverting the color subcarrier phase 180° for each successive line. That would tend to cancel any effect of interpreting luminance transitions as color in the demodulation process, but instead produced an effect that is called "chroma crawl." This is because each field has only 262.5 lines. The half line at the end causes the phase of the color subcarrier to be shifted only 90° for the beginning of the next field. So in a sequence of four successive fields of two frames the phase of the subcarrier is 0°, 270°, 180° and 90°. This is so because 227.5 Hz/line times 262.5 lines equals 59,718.75 cycles per field, and 119,437.5 cycles per frame. Consequently, on a field to field basis, the luminance transitions interpreted as color will appear, albeit to a lesser extent, and it will appear to crawl up the television screen. This is so even though there is a color frame rate of 14.985 Hz for 238,875 cycles of subcarrier per color frame.

This chroma crawl effect is readily apparent when viewing vertical edges of a calibrating color bar pattern, and will always be present in every video scene as a color distortion, particularly still pictures. It would therefore be desirable to eliminate chroma crawl in color television.

SUMMARY OF THE INVENTION

In accordance with the present invention, the upward moving pattern at the edges of luminance is eliminated by control of the vertical scan rate to end each field with one half cycle of the color subcarrier, instead of three quarters of a cycle, by causing the vertical sync generator to drop one quarter cycle at the end of each field. This is accomplished by feedback control on a clock pulse counter for the vertical sync generator to reset at the end of every field, i.e., at the occurrence of every vertical sync pulse (V), thereby shortening the field by one quarter cycle of the color subcarrier during each field. Consequently, there will be 59,718.5 cycles of the color subcarrier per field, instead of 59,718.75 cycles, for a phase inversion of the color subcarrier from field to field, thus eliminating chroma crawl. This is all done at the transmitter; the receiver will respond to the horizontal and vertical sync pulses (H and V) thus generated and transmitted to assure that each field displayed includes 59,718.5 cycles of the color carrier.

The novel features of the invention are set forth with particularity in the appended claims. The invention will best be understood from the following description when read in conjunction with the drawings.

DESCRIPTION OF PREFERRED EMBODIMENTS

Figure 1:
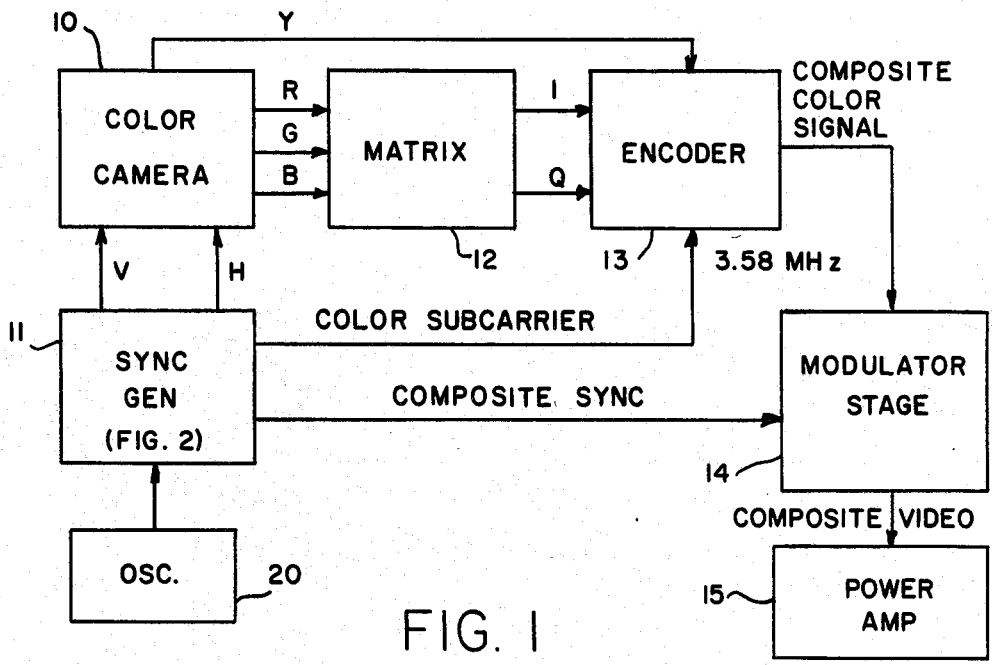
FIG. 1 is a general block diagram of a television camera connected to a transmission station, which may be broadcast or cable.

Referring first to FIG. 1, there is shown a color television camera 10 with an external sync generator 11 and a matrix 12 for combining red, green and blue color signals, or red, blue and luminance, to produce I and Q chroma signals to be encoded by a color subcarrier produced by the sync generator at precisely 3,579,545 Hz (usually by dividing down a crystal oscillator operating at four times the color subcarrier frequency).

For simplicity, it is assumed that direct luminance from the camera is used in an encoder 13 together with the color transmission primaries I and Q from the color matrix 12 to produce an NTSC composite color signal. A modulating stage 14 combines the composite color signal with a composite sync signal that includes not only the vertical and horizontal sync pulses (H and V) but also the color carrier bursts to form a composite video signal. The composite video signal is then carrier modulated and applied to a power amplifier 15 and to a transmitting antenna (not shown) for radiation to receivers, or to a cable system for transmission to receivers.

Figure 2:
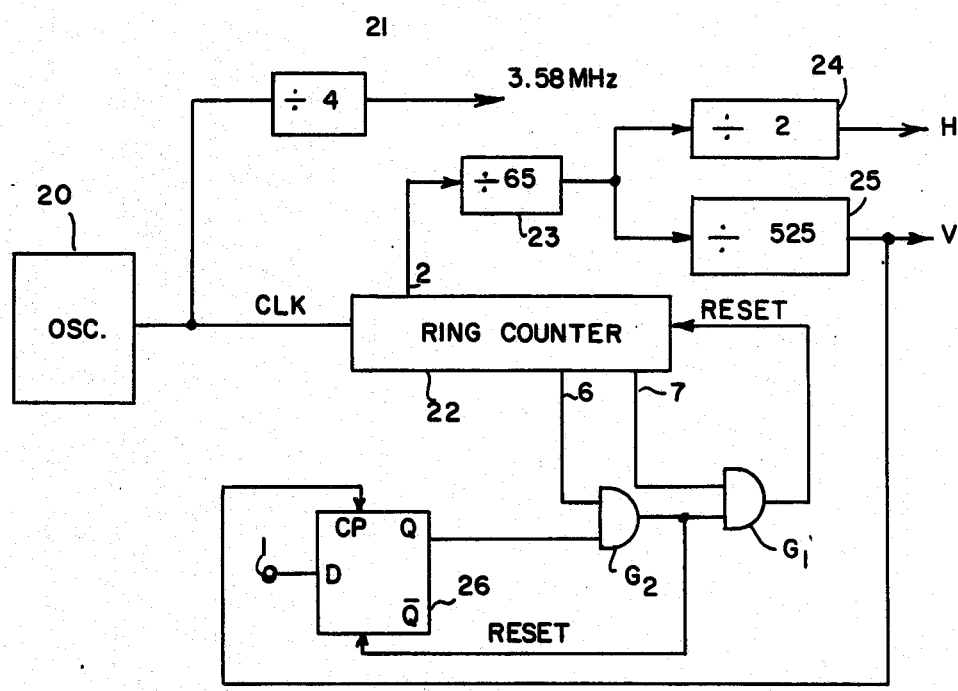
FIG. 2 is a functional block diagram of a preferred embodiment of the invention.

All of the foregoing is conventional in nature. What is new is the manner in which the vertical sync pulses are generated to control the number of color carrier cycles per field, as will now be described with reference to FIG. 2. A crystal oscillator 20 generates a stable frequency that is four times the color subcarrier of about 3.58 MHz. A divide-by-four counter 21 then produces the stable color subcarrier required.

The output of the oscillator 20 is also divided down by a ring counter 22 to generate a vertical sync pulse at 59.94 Hz by arranging for a reset feedback to cause dividing the input by seven. This may be done with a 74HC4017 integrated circuit which divides the input by a maximum of ten (10), but may be done by a 7-stage ring counter that normally produces successive output pulses at stages 1 through 7. What is illustrated is a 10-stage ring counter (the equivalent of the 74HC4017) with means for resetting the counter to zero after the seventh pulse is counted via an OR gate $G_1$ from the output count of 7. A divide-by-seven output thus produced is taken from an earlier count of 2 in each cycle of the counter. The frequency of that output (2,045,461.342 Hz) is then divided by 65 in a circuit 23 to obtain a frequency of 31468.636 Hz, and then by 2 in a circuit 24 to obtain the horizontal sync pulse (H) at the NTSC rate of 15,734. The output of the circuit 23 is also divided by 525 in a circuit 25 to obtain a vertical sync pulse (V) at the NTSC rate of 59.94 Hz.

The OR gate $G_1$ also resets the ring counter 22 early from the count of 6 once during each field upon the setting of a D-type flip-flop 26 by a vertical sync pulse (V). That enables an AND gate $G_2$, the output of which not only resets the ring counter 22 via the OR gate $G_1$ but also resets the D-type flip-flop. In that manner, one cycle of the input to the ring counter (which is 4 times the color subcarrier) is dropped once per field (i.e., once per 262.5 scan lines) during the vertical retrace. As a consequence, the horizontal scan frequency is advanced one quarter cycle of the color subcarrier at the start of every field in order to provide 59,718.5 cycles of the color subcarrier during each field, instead of 59,718.75 cycles as in the conventional implementation of the NTSC standard. The half cycle assures that each scan line will be precisely 180° out of phase, instead of 90° out of phase, to cancel the effect of interpreting luminance as color in the color demodulator of the receiver without creating a "chroma crawl" effect.

The parameters of the conventional NTSC standard and the parameters of the present improved color coding standard (ICCS) are set forth below for comparison. These definitions apply to both systems:
LPF=Lines per Field
LP2F=Lines per Frame
f(sc)=Color subcarrier frequency
f(H)=Horizontal scan rate
f(V)=Vertical scan rate (field rate)
f(fr)=Frame rate
f(ad)=Aural carrier differential (aural/visual carrier difference)
f(ab)=Aural beat frequency (aural/color carrier beat)

|  | NTSC | ICCS |
|---|---|---|
| LPF | 262.5 | 262.5 |
| LP2F | 525 | 525 |
| f(sc) | 3,579,545 Hz | 3,579,542.389 Hz |
| f(H) | 15,734 Hz | 15,734.318 Hz |
| f(V) | 59.94 Hz | 59.940 + Hz |
| f(fr) | 29.97 Hz | 29.970 + Hz |
| f(sc)cycle/line | 227.5 | 227.5 |
| f(sc)cycle/field | 59,718.75 Hz | 59,718.5 |
| f(sc)cycle/frame | 119,437.5 | 119,437 |
| f(ad) | 4,500,000 Hz | 4,500,000 Hz |
| f(ab) | 920,455 Hz | 920,455 Hz |
| f(ab)cycle/line | 58.5 | 58.5 |

This results in other advantages, such as obviating the need for "color framing" while running or editing video tape. This is so because line scans of each frame will be identical, i.e., all the line scan of a frame will be in phase with corresponding line scans of a successive frame. It also simplifies "freeze framing" for the reason that only two fields are required to complete a frame, and not four successive fields, and there is no need to decode and re-encode the color video when using two-field storage for freeze frames. Still other advantages are an improved picture with less flicker when converting to other international television standards, such as PAL and SECAM.

The luminance/chrominance artifacts of this improved color coding scheme are 180° out of phase from field to field, rather than 90° as in the conventional NTSC. This tends to cancel the visual perception of color artifacts due to visual integration. Yet this new color coding scheme is fully compatible with the NTSC standards. A conventional NTSC receiver will respond to vertical sync pulses of the modified composite video signal to achieve at the receiver precisely what is done at the camera, which is a field scan having 59,718.5 cycle of the color subcarrier per field. Otherwise, the desired 227.5 cycles of color subcarrier per line achieved under the conventional NTSC standard would be out of phase by 90° from field to field over four frames, instead of 180° out of phase from field to field in each frame.

In the broadest aspects of the invention, this is accomplished by controlling the color subcarrier and the vertical sync to end each field with one half cycle of subcarrier, rather than controlling only the color subcarrier and horizontal sync to end each line with a half cycle of color subcarrier. The feature of the NTSC standard of inverting the color subcarrier phase every scan line is retained; what is changed by also controlling the vertical sync is that the vertical sync pulse interval is shortened by one quarter cycle of the color subcarrier every field to avoid the progressive phase shift of the color subcarrier from field to field by 90°, thus eliminating the "chroma crawl" effect present in conventional NTSC standard television. As an additional advantage, the color subcarrier and the aural carrier intermodulator beat is kept at a precise 180° phase reversal every scan line to cancel any intermodulation beat f, (ab) per line that may otherwise be present.

Although particular embodiments of the invention have been described and illustrated herein, it is recognized that modifications and variations may readily occur to those skilled in the art. Consequently, it is intended that the claims be interpreted to cover such modifications and variations.

What is claimed is:

1. A method for an improved color television transmission compatible with NTSC standards comprised of the steps of generating a color subcarrier at about 3,579,545 Hz, by dividing down a clock frequency of four times the desired color subcarrier, dividing said clock frequency to produce a controlled horizontal scan rate at about 15,734 Hz with 227.5 cycles of color subcarrier per line, and dividing said clock frequency to produce a controlled vertical scan rate at about 59.940 Hz to produce frames of two interlaced fields, each at a rate of about 29.970 Hz with 59,718.5 cycles of said color subcarrier per field.

2. A method as defined in claim 1 wherein said vertical scan rate is produced by dividing said clock frequency by some set of multiples to produce said horizontal and vertical scan rates with 227.5 cycles of color subcarrier per line, and, once every field at the end thereof, skipping one cycle of said clock frequency in the generation of the horizontal and vertical sync pulses for the next field, thereby causing each field to have 59,718.5 cycles of said color subcarrier instead of 59,718.75 cycles, whereby the color subcarrier during each field of every interlaced frame is 180° out of phase with the color subcarrier of the next field.

3. In a color television transmission system compatible with NTSC standards, an improvement comprised of means for generating a color subcarrier at about 3,579,545 Hz by dividing down a clock frequency of four times the desired color subcarrier, means for dividing said clock frequency to produce a controlled horizontal scan rate at about 15,734 Hz with 227.5 cycles of color subcarrier per line, and means for dividing said clock frequency to produce a controlled vertical sync pulse at a rate of about 59.940 Hz to produce frames of two interlaced fields, each at a rate of about 29.970 Hz with 59,718.5 cycles of said color subcarrier per field.

4. An improvement as defined in claim 3 wherein said means for producing said horizontal and vertical scan rates with 227.5 cycles of color subcarrier per line, is comprised of means for skipping one cycle of said clock frequency once every field at the end thereof in the generation of the horizontal and field sync pulses for the next field, thereby causing each field to have 59,718.5 cycles of said color subcarrier instead of 59,718.75 cycles, whereby the color subcarrier during each field of every interlaced frame is 180' out of phase with the color subcarrier of the next field.

* * * * *